United States Patent [19]

Latka

[11] Patent Number: 5,646,996
[45] Date of Patent: Jul. 8, 1997

[54] AUTOMATIC RESYNCHRONIZATION OF TRANSMITTER IN THE EVENT OF CORRUPTED MEMORY

[75] Inventor: David Stanley Latka, Dearborn, Mich.

[73] Assignee: United Technologies Automotive, Inc., Dearborn, Mich.

[21] Appl. No.: 523,846

[22] Filed: Sep. 5, 1995

Related U.S. Application Data

[63] Continuation of Ser. No. 148,668, Nov. 5, 1993, abandoned.
[51] Int. Cl.$^6$ .................................................. H04L 9/00
[52] U.S. Cl. .................. 380/21; 380/23; 380/46; 380/48; 380/50; 371/67.1; 371/69.1; 375/358; 375/359
[58] Field of Search ........................ 375/359, 367, 375/369, 370, 365; 455/69, 70; 380/21, 23, 25, 48, 50; 371/67.1, 69.1; 340/825.31, 825.32, 825.56, 825.69

[56] References Cited

U.S. PATENT DOCUMENTS

| | | |
|---|---|---|
| 4,424,414 | 1/1984 | Hellman et al. . |
| 4,435,826 | 3/1984 | Matsui ........................... 375/115 |
| 4,596,985 | 6/1986 | Bongard et al. . |
| 4,613,980 | 9/1986 | Newlin et al. ..................... 375/115 |
| 4,758,835 | 7/1988 | Rathmann et al. . |
| 4,771,463 | 9/1988 | Beeman . |
| 4,847,614 | 7/1989 | Keller . |
| 4,876,718 | 10/1989 | Citta et al. . |
| 5,109,152 | 4/1992 | Takagi et al. . |
| 5,109,221 | 4/1992 | Lambropoulos et al. . |
| 5,144,667 | 9/1992 | Pogue, Jr. et al. . |
| 5,146,215 | 9/1992 | Drori . |
| 5,243,653 | 9/1993 | Malek et al. . |
| 5,313,491 | 5/1994 | Schramm et al. ............... 375/115 |
| 5,319,364 | 6/1994 | Waraksa et al. . |
| 5,442,341 | 8/1995 | Lambropoulos . |

*Primary Examiner*—Wellington Chin
*Assistant Examiner*—Jean B. Corrielus

[57] ABSTRACT

Loss of synchronization between transmitter and receiver of a remote entry system is detected during the communication sequence between transmitter and receiver, by generating a checksum of the authentication code at the initiation of the communication sequence and comparing it with a checksum previously stored. If the checksums do not match an automatic resynchronization sequence is begun in which random numbers are generated by the transmitter and broadcast to the receiver for subsequent use as rolling code or linear feedback shift register variables.

20 Claims, 3 Drawing Sheets

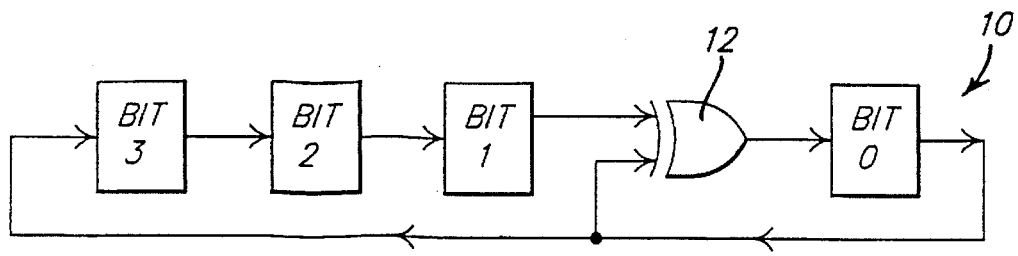
FIG. 1.
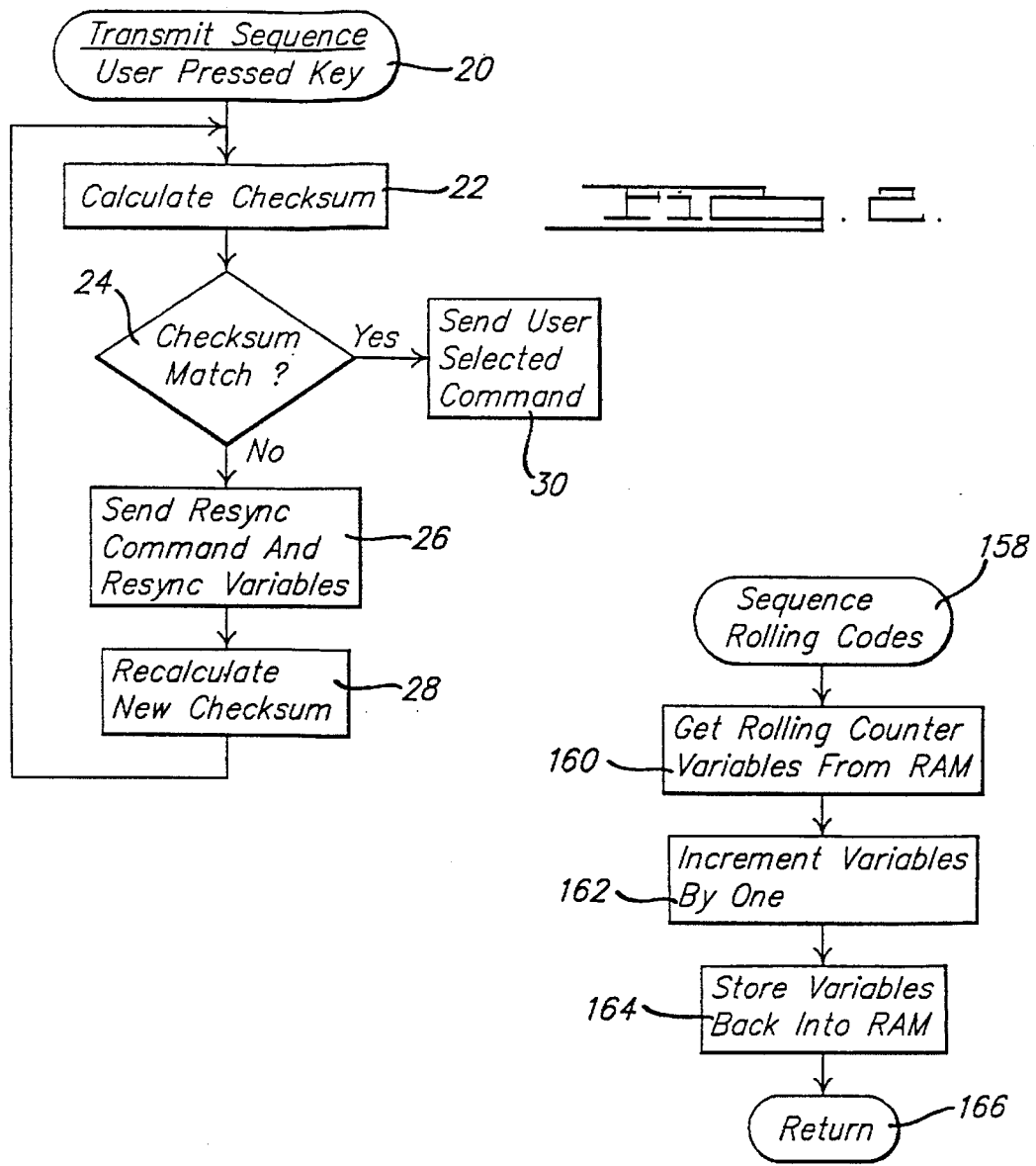
FIG. 2.
FIG. 3.

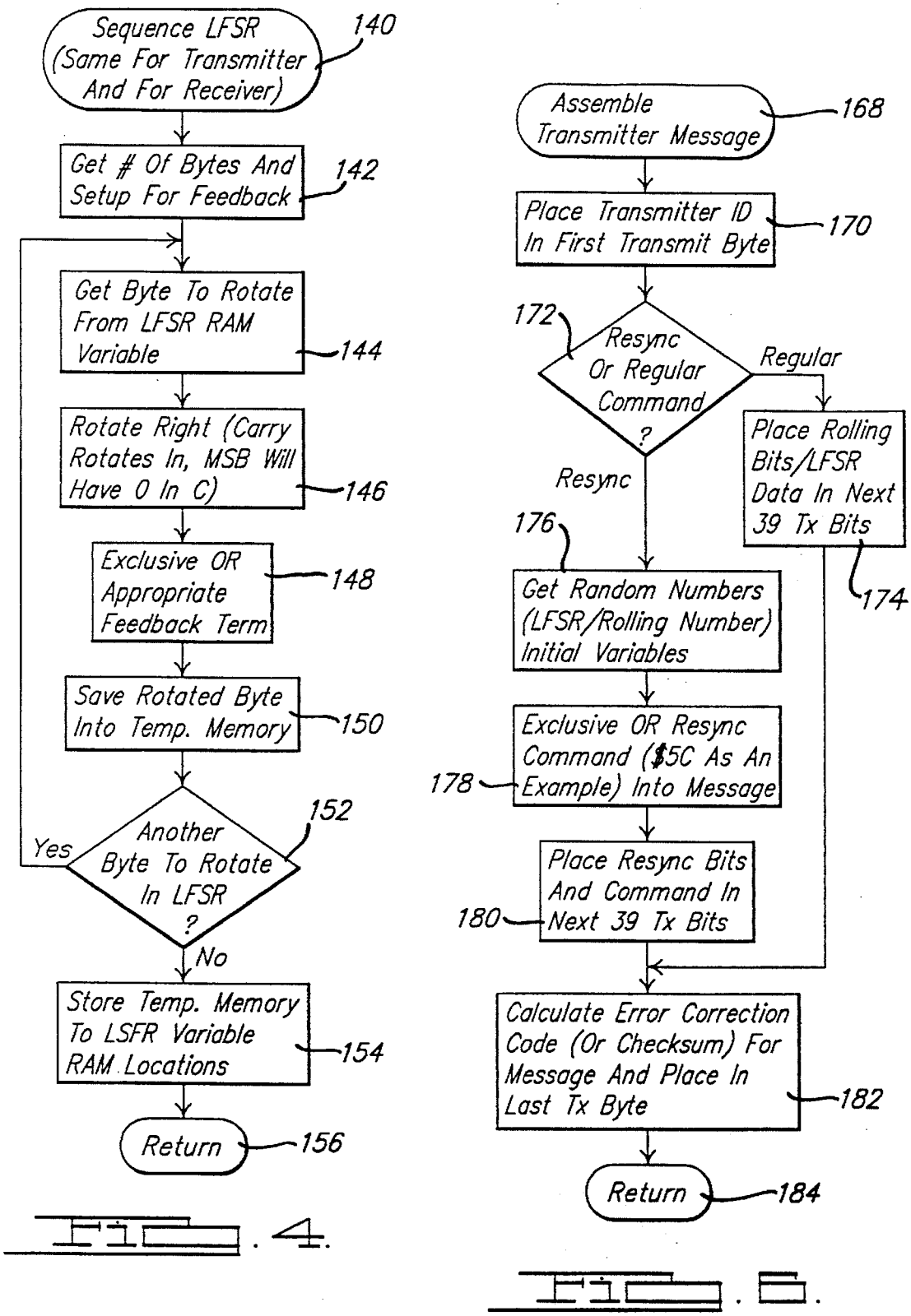

5,646,996

AUTOMATIC RESYNCHRONIZATION OF TRANSMITTER IN THE EVENT OF CORRUPTED MEMORY

This is a continuation of U.S. patent application Ser. No. 08/148,668, filed on Nov. 5, 1993, now abandoned.

BACKGROUND AND SUMMARY OF THE INVENTION

The present invention relates generally to keyless entry systems. More particularly, the invention relates to a method for automatically resynchronizing the transmitter/receiver pair when synchronization is lost due to momentary power failure or a low battery condition, for example.

Rolling code authentication is a common form of vehicle entry security. In such a system, a transmitter is provided in the form of a key fob and a receiver is positioned in the vehicle where it is able to receive encoded transmission from the key fob transmitter. Rolling code authentication can be performed by employing a simple linear counter which advances with each key fob command. The receiver in the vehicle is configured to always expect an increasing value and therefore it disallows repeating counter values. Thus to be in sync the transmitter counter should never fall behind the count of the receiver, nor should the transmitter counter be permitted to get too far ahead of the receiver count. More complex authentication using linear shift feedback register (LFSR) technology is also used as a more secure technique for vehicle entry security.

For a number of reasons, a rolling code authentication system can occasionally fall out of synchronization when the counter values of the transmitter are less than that of the receiver or when the transmitter counter values are greater than those of the receiver by a predetermined number. One reason for losing synchronization is corrupted volatile memory, which can be due to momentary loss of battery power or low battery voltage.

One way to ensure against loss of synchronization is to outfit the transmitter with a nonvolatile memory such as an EEPROM which can be used to store the rolling values so they will not be lost. Being nonvolatile, the EEPROM will not lose synchronization due to a power interruption (e.g. loose battery connection or battery failure). The EEPROM protects the integrity of the counters when the internal RAM is powered-off.

However, EEPROM devices are comparatively expensive and it would be desirable to eliminate them from the rolling code authentication circuitry. This presents a problem, since without nonvolatile memory, a system would have to rely on RAM (volatile memory) to store counter values. The need to rely on RAM increases the possibility of corrupted counter values, since even temporary loss of power through a loose battery connection or loss of battery charge would break synchronization.

The present invention addresses the synchronization problem by providing a system which automatically resynchronizes the transmitter/receiver pair when corrupted memory is detected. Ordinarily the user is not even aware resynchronization is being performed. This is accomplished by calculating and storing a first checksum indicative of the state of the transmitter at a first instance in time. Thereafter, the communications sequence is initiated between transmitter and receiver and the initiation of this sequence automatically causes a second checksum to be calculated. The second checksum is indicative of the state of the transmitter at that second instance in time. The checksums are compared and if the checksums are different, the resynchronization sequence is automatically initiated.

For a more complete understanding of the invention, its objects and advantages, reference may be made to the following specification and to the accompanying drawings.

BRIEF DESCRIPTION OF THE DRAWINGS

FIG. 1 is a block diagram of an exemplary four bit linear feedback shift register, useful in understanding the principles of the invention;

FIG. 2 is an overview flowchart diagram illustrating the principles of the invention;

FIGS. 3–6 are flowchart diagrams setting forth the synchronization method of the invention in detail.

DESCRIPTION OF THE PREFERRED EMBODIMENT

Figure 3:
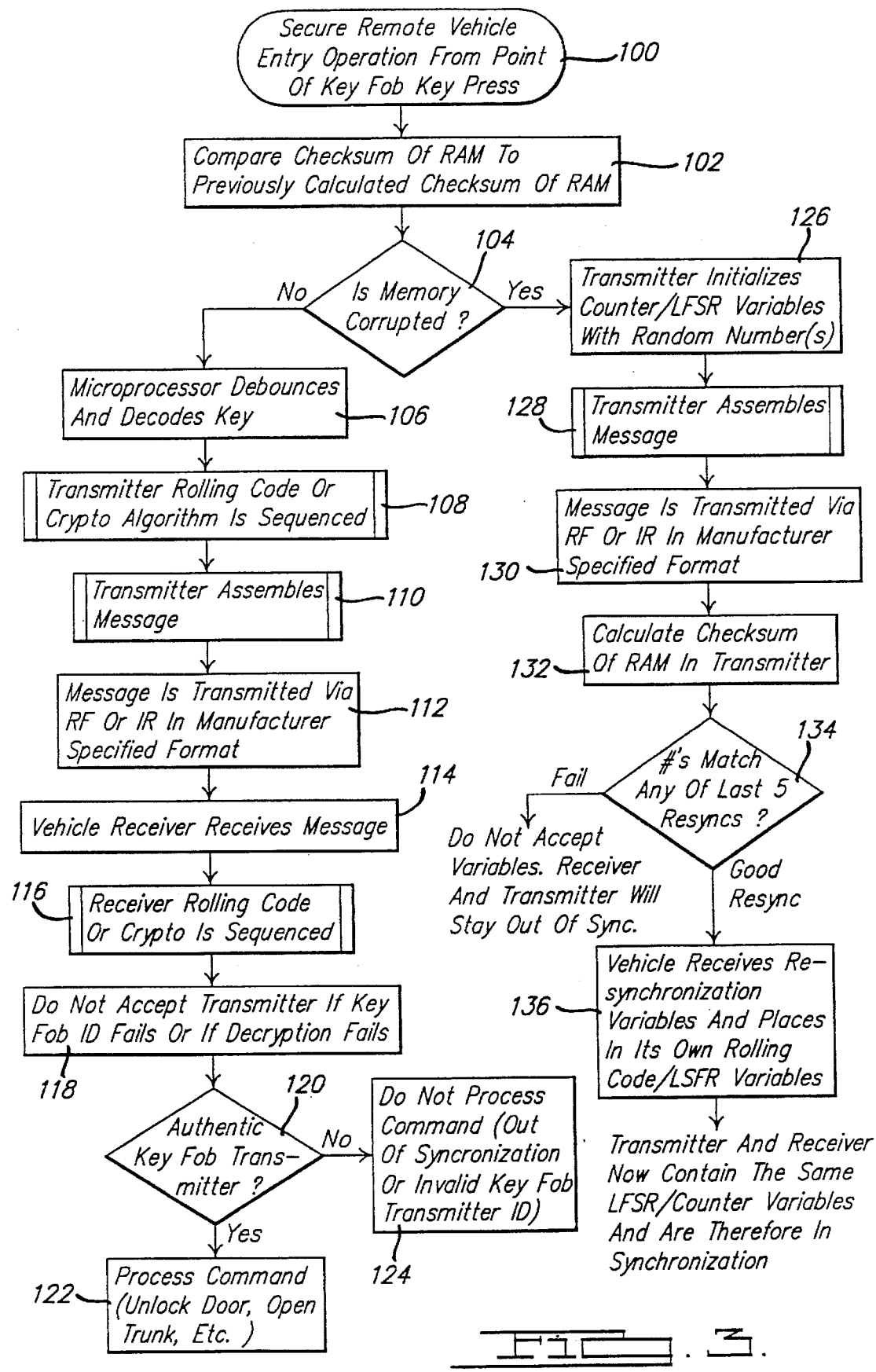

In order to understand the method of synchronizing some understanding of linear feedback shift register technology may be helpful, since the invention can be used with LFSR security systems. Accordingly, in FIG. 1 a four bit linear feedback shift register (LFSR) is depicted at 10. The shift register includes four memory cells in which four bits are stored, designated bit 3, bit 2 . . . bit 0, consecutively. The shift register is configured so that each cycle or rotation causes the contents of one bit to be shifted or transferred to its rightmost neighbor (with the exception of bits which feed an exclusive OR device).

The LFSR device also includes one or more exclusive OR operations. In FIG. 1 a single exclusive OR 12 has been illustrated, with its output supplying bit 0 and with its inputs connected to the output of bit 1 and the output of bit 0, as illustrated. Thus with each cycle or rotation, the contents of bit 1 are combined with the contents of bit 0 in an exclusive OR operation and the resultant is then stored at bit 0. The linear feedback shift register 10 illustrated in FIG. 1 is merely provided as an example. In practice, the shift register can be any number of bits, typically a larger number than four bits, and the number and location of exclusive OR operations can vary to provide different encryption codes.

In the keyless entry system the linear feedback shift register works by rotating the authentication bits, n times, through the shift register with exclusive OR feedback taps between a few of the bit locations. With each transmission, the transmitter performs a linear feedback shift register (LFSR) shift operation, which scrambles the authentication information and sends this scrambled authentication information to the receiver along with the selected command (unlock, lock, trunk, etc.). An identical LFSR operation on the receiver authentication variables is performed in the receiver after it receives a command from the transmitter. The receiver compares the results of its own LFSR operation to the authentication variables sent by the transmitter. The authentication information is validated if the receiver comparison matches.

A synchronization issue can arise when the transmitter authentication variables are lost due to power interruption. The present invention provides a method for automatically detecting corrupted authentication variables and providing for a resynchronization of those variables.

Referring to FIG. 2, an overview of the synchronization method will be given. Thereafter, a detailed explanation will be given using FIGS. 3–6. Referring to FIG. 2, the synchronizing method is automatically invoked when the transmit sequence is initiated through a user-pressed key. This is illustrated at step 20. In response to step 20 a checksum is calculated at step 22 and this checksum is compared with a stored checksum calculated during the previous transmission sequence. If the checksums match, the user-selected command is sent as indicated at step 30. On the other hand, if the checksums do not match a resync command and a series of resync variables are sent at step 26. Thereafter, a new checksum is calculated at step 28 and the routine then branches back to repeat steps 22 and 24.

From FIG. 2 it is seen that if the checksums do not match, due to a temporary loss of power and resulting loss of the stored checksum, for example, the resynchronization routine ensure a checksum match on the next cycle. Also, by virtue of step 26, the receiver is supplied with resynchronization variables to allow it to also match the new authentication code.

Referring to FIG. 3, the synchronizing method is illustrated, beginning at the point at which a key fob key is pressed (state 100). From this state control proceeds to step 102 where the checksum previously stored is compared with the newly calculated checksum. If the checksums match the memory is declared not corrupted. On the other hand, if the checksums do not match the memory is declared corrupted. Thus, in step 104, if the memory is not corrupted, control proceeds to step 106. Step 106 ultimately leads to step 122 at which the user-selected command is executed. On the other hand, if the memory is corrupted control proceeds to step 126 whereby synchronization is re-established. The following will explain both possibilities.

If Memory Is Not Corrupted

When the memory is not corrupted as determined at step 104, the user's keypad input is debounced and decoded by the transmitter microprocessor. This is illustrated at step 106. Thereafter, the transmitter rolling code or cryptographic algorithm is sequenced, as indicated at step 108. Additional details regarding the sequencing operations are set forth in connection with FIGS. 4 and 5.

Once the rolling code has been sequenced, the transmitter assembles a message at step 110 and this message is broadcast at step 112 via RF or IR transmission to the receiver located in the vehicle. The vehicle receiver then receives the transmitted message at step 114 whereupon the receiver performs its rolling code or cryptographic algorithm sequencing at step 116. At this point, the authentication codes generated at steps 108 and 116, respectively are compared at step 118. If the authentication codes match and if the transmitted command properly decodes, then the transmitter is deemed to be authentic at step 120 and the process command is performed at step 122.

In the alternative, if the authentication codes do not match, or if the transmitted command is not meaningfully decoded, then step 120 will cause the process to branch to step 124 at which the sequence is deemed to be out of synchronization or alternatively an invalid key fob transmitter may be assumed. In other words, at step 124 either the wrong transmitter was used (in which case the command will never be successful) or the right transmitter was used but it is out of sequence with the receiver If Memory Is Corrupted - The Resynchronization Procedure If the memory is declared corrupted at step 104 control proceeds to step 126 where the resynchronization procedure is commenced. At step 126 the transmitter initializes its counter and loads its LFSR variables with random numbers. The transmitter then assembles a message at step 128 and this message is transmitted via RF or IR transmission at step 130 to the receiver. Next, at step 132 a checksum of the transmitter RAM is calculated and stored. Thereafter, at step 134 a comparison is made to determine whether any of the last five random numbers stored in the receiver match those broadcast by the transmitter. (Although the preferred embodiment tests five numbers, a larger or smaller set of numbers could be used, if desired.) If the numbers match, step 134 is declared to have failed and the LFSR variables sent by the transmitter are rejected by the receiver. In this case, the receiver and transmitter will stay out of synchronization. On the other hand, if any of the last five resynchronization numbers do not match, successful resynchronization is declared. Upon this declaration in step 136 the receiver acquires the resynchronization numbers sent from the transmitter and places them in its own rolling code LFSR variable registers, whereupon the transmitter and receiver will now both contain the same LFSR and counter variables and are therefore in synchronization.

Further Implementation Details

The LFSR sequence utilized by both transmitter and receiver is illustrated in FIG. 4. Beginning at step 140, the sequence proceeds to step 142 where the number of bytes in the sequence is supplied and a software loop is initiated to effect the LFSR rotation. As previously explained, one or more exclusive OR operations may be interposed between selected bits of a given byte or word. (In FIG. 1 a single exclusive OR operation was positioned between bit 1 and bit 0). In step 142 the selected position of one or more exclusive OR operations is set up, so that the appropriate exclusive OR operations will occur as the cycle proceeds. If desired, the selected configuration of exclusive OR operations can be supplied as a digital word or "mask" to be applied as a setup parameter. Alternatively the mask can be permanently or semi-permanently manufactured into the system or programmed into the system by the manufacturer or dealer.

Next, at step 144, a byte is fetched into the LFSR RAM variable so that the LFSR sequence can be performed upon it. This is illustrated at steps 146, 148 and 150. In step 146 a rotate-right operation is performed on the LFSR variable, with the most significant bit (MSB) having a forced zero in its carry register. The exclusive OR operations are performed at step 148, with the resultant being supplied as feedback terms in accordance with the setup mask established at step 142. Then, in step 150, the rotated byte resulting from steps 146 and 148 is stored into a temporary memory location. Next, at step 152, if there are additional bytes queued up for rotation, the sequence returns to step 144 where the next byte is fetched and the process is repeated.

Once all of the bytes have been rotated according to steps 144-150, the temporary memory (stored as step 150) is written to the LFSR variable in RAM and control returns (step 156) to the calling program.

FIG. 5 depicts, beginning at step 158, the manner of sequencing rolling codes. As depicted at step 160, the rolling counter variable is retrieved from RAM, this variable is then incremented by one (step 162) and stored back in RAM (step 164). Control then returns to the calling program (step 166).

The presently preferred embodiment assembles transmitter messages as illustrated in FIG. 6. Beginning at step 168, the transmitter message is assembled by first placing the transmitter ID in the first transmission byte (step 170). Next, a decision is made (step 172) as to whether the message is a resychronization message or a regular command. Regular commands are assembled (step 174) by placing the rolling bits and LFSR data in the next 39 bits to be transmitted. If the command is a resynchronization command, the message is assembled by first generating or fetching random numbers (step 176) which serve as LFSR/rolling number initial variables. Next, at step 178, the exclusive OR resync command is inserted into the message. Thereafter (step 180) the resynchronization bits are placed in the message along with the desired command into the next 39 transmission bits.

Once the message has been assembled (either regular or resynchronization) an error correction code or checksum is calculated for that message and it is also placed in the message at the last transmission byte location. In this way, the message to be sent from transmitter to receiver is assembled. The receiver is thus able to decode the message by following the reverse procedure. After the message is assembled the routine returns (step 184) to its calling program.

While a rolling code authentication using linear feedback shift register technology has been illustrated, the method of synchronizing transmitter and receiver is not limited to LFSR techniques. In general, the invention can be used with any cryptographic authentication which is capable of supporting the checksum technique.

While the invention has been described in its presently preferred embodiment, it will be understood that the invention is capable of modification without departing from the spirit of the invention as set forth in the appended claims.

What is claimed is:

1. A method of synchronizing a transmitter and a receiver in a keyless entry system of the type in which the transmitter comprises a plurality of coded states, comprising:

calculating and storing a first error check code indicative of the state of the transmitter at a first time;

initiating a communication sequence between the transmitter and receiver;

calculating a second error check code indicative of the state of the transmitter at a second time in response to initiating a communication sequence;

comparing the first and second error check codes; and automatically initiating a resynchronization sequence between said transmitter and receiver if said first error check code differs from said second error check code.

2. The method of claim 1, wherein said resynchronization sequence comprises the step of sending a resynchronization code from said transmitter to said receiver.

3. The method of claim 2, wherein said resynchronization sequence comprises the step of sending at least one random number from said transmitter to said receiver.

4. The method of claim 2, wherein said resynchronization sequence comprises the steps of:

storing a command decoding value in said receiver;

sending a first command code from transmitter to receiver; and completing said resynchronization sequence when said first command code matches said stored command decoding value.

5. The method of claim 1, wherein said resynchronization sequence comprises the steps of:

generating and storing at least one first random number in the transmitter;

generating and storing at least one second random number in said receiver;

transmitting said at least one first random number to the receiver;

comparing the first and second random numbers; and declaring the transmitter and the receiver to be in synchronization if said first and second random numbers match; and declaring the transmitter and the receiver to be out of synchronization if said first and second random numbers do not match such that said resynchronization sequence is automatically initiated.

6. The method of claim 1, further comprising the step of calculating and storing a new error check code to replace said first error check code in response to said initiation of the resynchronization sequence.

7. The method of claim 5, wherein said step of declaring the transmitter and the receiver to be in synchronization comprises the step of communicating a user selected command from the transmitter to the receiver.

8. A method of synchronizing a receiver and a transmitter having a plurality of states, the method comprising the steps of:

calculating a first error check code indicative of the state of the transmitter at a first time;

initiating a communication sequence between the transmitter to the receiver;

calculating a second error check code indicative of the state of the transmitter at a second time in response to said step of initiating a communication sequence; and comparing the first and second error check codes such that a resynchronization sequence between said transmitter and receiver is automatically initiated in response to said first error check code being different than said second error check code.

9. The method of claim 8, wherein said resynchronization sequence comprises a resynchronization code sent by the transmitter to the receiver.

10. The method of claim 9, wherein said resynchronization sequence comprises a random number.

11. The method of claim 9, wherein said resynchronization sequence comprises:

a command decoding value in stored in the receiver; and a first command code transmitted from the transmitter to the receiver, such that said resynchronization sequence is completed when said first command code matches said command decoding value stored in the receiver.

12. The method of claim 8, wherein said resynchronization sequence comprises the steps of:

generating a first random number in the transmitter;

generating a second random number in the receiver; and transmitting said first random number to the receiver;

comparing the first random number with the second random number;

declaring the transmitter to be in synchronization if said first random number matches said second random number; and declaring transmitter and receiver to be out of synchronization if said first random number does not match said second random number such that said resynchronization sequence is automatically initiated.

13. The method of claim 12, wherein said step of declaring the transmitter and the receiver to be in synchronization comprises the steps of communicating a message from the transmitter to the receiver.

14. The method of claim 8, further comprising the step of calculating a new error check code to replace said first error check code in response to said resynchronization sequence being initiated.

15. A system for synchronizing a receiver and a transmitter for transmitting the message, the system comprising:

the transmitter and the receiver for initiating a communication sequence;

a computer for calculating a first error check code indicative of the state of the transmitter at a first time, and for calculating a second error check code indicative of the state of the transmitter at a second time in response to said communication sequence being initiated; and a comparator for comparing said first error check code with said second error check code such that a resynchronization sequence between said transmitter and receiver is automatically initiated by said computer in response to said first error check code being different than said second error check code.

16. The system of claim 15, wherein said computer comprising a memory for storing said first error check code and said second error check code.

17. The system of claim 15, wherein said resynchronization sequence comprises:

a resynchronization code sent by the transmitter to the receiver; and a random number.

18. The system of claim 16, wherein said resynchronization sequence comprises:

a command decoding value in stored in the receiver; and a first command code transmitted from the transmitter to the receiver such that said resynchronization sequence is automatically completed by said computer when said first command code matches said command decoding value stored in the receiver.

19. The system of claim 15, wherein said resynchronization sequence, as executed by said computer, comprises the steps of:

generating a first random number in the transmitter;

generating a second random number in the receiver; and transmitting said first random number to the receiver;

comparing the first random number with the second random number;

declaring the transmitter to be in synchronization if said first random number matches said second random number the such that a message is communicated from the transmitter to the receiver; and declaring transmitter and receiver to be out of synchronization if said first random number does not match said second random number such that said resynchronization sequence is automatically initiated.

20. The system of claim 15, wherein said computer further calculates a new error check code to replace said first error check code once said resynchronization sequence is initiated.

* * * * *